United States Patent
Jubin et al.

(10) Patent No.: US 12,066,694 B2
(45) Date of Patent: Aug. 20, 2024

(54) COMFORT-OPTIMIZED CONTACT LENS SYSTEM FOR NON-ROTATIONALLY SYMMETRIC EYE ABERRATION

(71) Applicant: Johnson & Johnson Vision Care, Inc., Jacksonville, FL (US)

(72) Inventors: Philippe F. Jubin, Fernandina Beach, FL (US); James Michalski, St. Johns, FL (US); Benjamin J. K. Straker, Jacksonville, FL (US); Pierre-Yves Gerligand, St. Johns, FL (US); Giovanna O Olivares-Petito, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 18/232,843

(22) Filed: Aug. 11, 2023

(65) Prior Publication Data

US 2023/0384619 A1    Nov. 30, 2023

Related U.S. Application Data

(63) Continuation of application No. 17/670,597, filed on Feb. 14, 2022, now Pat. No. 11,774,780, which is a continuation of application No. 16/918,268, filed on Jul. 1, 2020, now Pat. No. 11,281,024, which is a continuation of application No. 14/737,870, filed on Jun. 12, 2015, now Pat. No. 10,739,617.

(51) Int. Cl.
    *G02C 7/04*    (2006.01)

(52) U.S. Cl.
    CPC ............. *G02C 7/048* (2013.01); *G02C 7/045* (2013.01); *G02C 7/047* (2013.01); *G02C 2202/08* (2013.01); *G02C 2202/22* (2013.01)

(58) Field of Classification Search
    CPC ........ G02C 7/048; G02C 7/045; G02C 7/047; G02C 2202/08; G02C 2202/22
    USPC ....................................... 351/159.07
    See application file for complete search history.

(56) References Cited

U.S. PATENT DOCUMENTS

| 6,089,711 | A  | 7/2000 | Blankenbecler |
| 6,113,236 | A  | 9/2000 | Chapman |
| 6,176,578 | B1 | 1/2001 | Clutterbuck |
| 6,176,580 | B1 | 1/2001 | Roffman et al. |

(Continued)

FOREIGN PATENT DOCUMENTS

| CN | 101341435 A | 1/2009 |
| CN | 203982004   | 12/2014 |

(Continued)

OTHER PUBLICATIONS

Graeme Young: "Soft toric lens design and fitting", "Efron Contact lens practice", Dec. 31, 2010, XP 055309209, ISBN: 978-0-7506-8869-7, pp. 119-127.

(Continued)

*Primary Examiner* — Wyatt A Stoffa
*Assistant Examiner* — Mitchell T Oestreich

(57) ABSTRACT

A system of contact lenses includes at least two contact lenses, each lens having a visual correction for a non-rotationally symmetric eye aberration. Each lens has a different level or degree of a stabilization that is characterized by a thickness differential between a thickness of a stabilization zone and a thickness of a non-stabilization zone.

13 Claims, 5 Drawing Sheets

(A)

(B)

(C)

(56) References Cited

U.S. PATENT DOCUMENTS

| | | |
|---|---|---|
| 8,038,294 B2 | 10/2011 | Hibino |
| 2004/0233382 A1 | 11/2004 | Lindacher |
| 2007/0146628 A1 | 6/2007 | Green |
| 2009/0225273 A1 | 9/2009 | Clutterbuck |
| 2011/0149231 A1 | 6/2011 | Gerligand |
| 2013/0077045 A1 | 3/2013 | Gerligand |
| 2014/0055744 A1* | 2/2014 | Wildsmith ............ G02C 7/048 351/159.01 |
| 2014/0104563 A1 | 4/2014 | Bakaraju |

FOREIGN PATENT DOCUMENTS

| | | |
|---|---|---|
| EP | 1982228 A2 | 10/2008 |
| EP | 2518554 A1 | 10/2012 |
| JP | H11242192 | 9/1999 |
| RU | 2352292 C2 | 4/2009 |
| WO | WO2004023374 A1 | 3/2004 |
| WO | WO2009017516 A1 | 2/2009 |

OTHER PUBLICATIONS

Exam Report from corresponding Russian Appln. No. 2016122876 dated Feb. 28, 2018.

Search Report from Corresponding SG Appln. No. 10201603951P dated Jun. 22, 18.

Extended European Search Report Received for European Patent Application No. 16174042.8, mailed Oct. 20, 2016, 9 pages.

Maldonado-Codina, et al., "Soft Toric Design and Fitting", Contact Lens Practice E-Book, vol. 65, pp. 119-127, 2010.

* cited by examiner

COMFORT-OPTIMIZED CONTACT LENS SYSTEM FOR NON-ROTATIONALLY SYMMETRIC EYE ABERRATION

RELATED APPLICATIONS

This application is a continuation of U.S. patent application Ser. No. 17/670,597 filed on Feb. 14, 2022 that is currently pending, which is a continuation of U.S. patent application Ser. No. 16/918,268 filed on Jul. 1, 2020 that granted as U.S. Pat. No. 11,281,024 on Mar. 22, 2022, which is a continuation of U.S. patent application Ser. No. 14/737,870 filed on Jun. 12, 2015 that granted as U.S. Pat. No. 10,739,617 on Aug. 11, 2020.

BACKGROUND OF THE INVENTION

Field of the Invention

The present invention is related to a system of contact lenses, each lens having a different level or degree of stabilization corresponding to a vision correction for a non-rotationally symmetric eye aberration and to a method of optimizing comfort for a patient by varying stabilization design as a function of a required vision correction.

Discussion of Related Art

Myopia or nearsightedness is an optical or refractive defect of the eye wherein rays of light from an image focus to a point before they reach the retina. Myopia generally occurs because the eyeball or globe is too long or the cornea is too steep. A minus or negative powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus or positive powered spherical lens may be utilized to correct hyperopia.

Astigmatism is an optical or refractive defect in which an individual's vision is blurred due to the inability of the eye to focus a point object into a focused image on the retina. Astigmatism is caused by a non-rotationally symmetric curvature of the refracting surfaces of the eye (including the cornea and crystalline lens). A non-astigmatic eye has rotationally symmetric refracting surfaces whereas in an individual with astigmatism, the refracting surfaces are not rotationally symmetrical. In other words, one or more of the refracting surfaces are more curved or steeper in one principal meridian relative to the other orthogonal principal meridian, thereby causing an image to be stretched out into two line foci rather than focused to a single point. A non-rotationally symmetric lens rather than a rotationally symmetric lens may be utilized to resolve astigmatism.

Contact lenses may be utilized to correct myopia, hyperopia, astigmatism as well as other visual acuity defects. Contact lenses may also be utilized to enhance the natural appearance of a wearer's eyes. Contact lenses or contacts are simply lenses placed on the anterior surface of the eye. Contact lenses are considered medical devices and may be worn to correct vision and/or for cosmetic or other therapeutic reasons. Early contact lenses were made or fabricated from hard materials, were relatively expensive, and were fragile. In addition, these early contact lenses were fabricated from materials that did not allow sufficient oxygen transmission through the contact lens to the conjunctiva and cornea, which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses combine the benefit of silicone, which has extremely high oxygen permeability, with the proven comfort and clinical performance of hydrogels.

Essentially, these silicone hydrogel based contact lenses have higher oxygen permeabilities and are generally more comfortable to wear than the contact lenses made of the earlier hard materials.

Contact lenses may be broadly categorized as daily disposable contact lenses, frequent replacement contact lenses and traditional contact lenses. Daily disposable contact lenses, as the name implies, are worn for a single day and discarded. Cleaning solutions are not typically utilized with these lenses. Frequent replacement contact lenses include lenses that may be reused for two weeks up to one month depending on the manufacturer's and/or the doctor's recommendation and generally require cleaning and disinfection every day. There are even contact lenses that are approved for longer periods of reuse. Frequent replacement lenses also include extended wear contact lenses which may be worn during sleep. Traditional contact lenses or reusable contact lenses are worn for much longer periods and are typically discarded approximately every six months.

Corneal astigmatism may be corrected using a hard or rigid gas permeable contact lens. In this case, a fluid or tear lens may exist between the posterior surface of the rigid contact lens and the cornea. This fluid or tear lens follows or assumes the shape of the back surface of the contact lens. Since the index of refraction of the fluid or tear lens is nearly a match for the cornea, the corneal toricity is optically neutralized or reduced. In these cases, a toric lens will generally not be required. However, rigid gas permeable contact lenses and hard contact lenses are generally less comfortable than soft or hydrogel contact lenses. Since soft or hydrogel contact lenses wrap around the cornea, a fluid lens is generally not found and the tear fluid more closely resembles a thin film. In this case, a toric lens design is required.

A toric lens is an optical element having two different powers in two orientations that are perpendicular to one another. Essentially, a toric lens has one power, spherical, for correcting myopia or hyperopia and one power, cylinder, for correcting astigmatism built into a single lens. These powers are created with curvatures oriented at different angles which are preferably maintained relative to the eye. Toric lenses may be utilized in eyeglasses, intraocular lenses, and contact lenses. The toric lenses used in eyeglasses and intraocular lenses are held fixed relative to the eye by either the spectacle frame or haptics thereby always providing optimal vision correction. However, toric contact lenses may tend to rotate on the eye, thereby temporarily providing sub-optimal vision correction.

Accordingly, currently-utilized toric contact lenses also include a mechanism to keep the contact lens relatively stable on the eye when the wearer blinks or looks around. For many high order aberrations, many of which are not rotationally symmetric, positional stability is also required to provide optimal vision correction.

The use of contact lenses is problematic in that each contact lens of the pair must be maintained at a specific orientation while on the eye to be effective. When the contact lens is first placed on-eye, it must automatically position, or auto-position, itself and then maintain that position over time. However, once the contact lens is positioned, it tends to rotate on the eye due to the force exerted on the contact lens by the eyelids during blinking as well as eyelid and tear film movement.

Maintenance of the on-eye orientation of a contact lens typically is accomplished by altering the mechanical characteristics of the contact lens. For example, prism stabilization, including decentering or tilting of the contact lens' front surface relative to the back surface, thickening of the inferior contact lens periphery, forming depressions or elevations on the contact lens' surface, and truncating the contact lens edge, are all methods that have been utilized.

Additionally, static stabilization has been used in which the contact lens is stabilized by the use of thick and thin zones, or areas in which the thickness of the contact lens' periphery is increased or reduced, as the case may be. Typically, the thick and thin zones are located in the contact lens' periphery with symmetry about the vertical and/or horizontal axes. For example, each of two thick zones may be positioned on either side of the optic zone and centered along the 0-180 degree axis of the contact lens. In another example, a single thick zone positioned at the bottom of the contact lens providing a similar weight effect, like that of prism stabilization, but also incorporating a region of increasing thickness from top to bottom in order to utilize upper eyelid forces to stabilize the contact lens may be designed. It is important to note that the older technical literature utilizes the term dynamic stabilization for what is meant here as static stabilization. Accordingly, for purposes of this invention static and dynamic stabilization may be utilized interchangeably.

The challenge with currently designed or utilized stabilization zones is a tradeoff between contact lens stability and comfort, plus the physical limitations associated with increased thickness. With a static or dynamic stabilization zone, the slope of the stabilization zone is fixed in the contact lens. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. Conventional designs require tradeoffs in performance between these two modes.

The higher the amount of cylinder correction designed into a contact lens, the more sensitive the lens is to axis misalignments and rotational stability on eye in terms of adversely affecting the wearer's visual acuity. Therefore, a higher cylinder correction requires a robust stabilization mechanism in the lens design. Such a stabilization mechanism, however, can cause an increased awareness for patients, as the eyelids interact with the mechanical stability features on the lens. For lower cylinder corrections, lens designs are less sensitive to axis misalignments and rotational stability, thereby allowing more rotation from the nominal position for similar impact on optical quality compared to higher cylinder corrections.

SUMMARY OF THE INVENTION

The system according to the present invention overcomes the limitations of the prior art by providing a system of contact lenses, each lens having a different level or degree of stabilization for a non-rotationally symmetric ocular aberration. The system ensures vision correction, while also providing comfort by minimizing lens awareness.

In accordance with one aspect, the present invention is directed to a system of contact lenses comprising at least two contact lenses, each lens having a visual correction for a non-rotationally symmetric eye aberration. Each lens has a different level or degree of stabilization that comprises a thickness differential between a thickness of a stabilization zone and a thickness of a non-stabilization zone.

In accordance with another aspect, the present invention is directed to a method for optimizing lens comfort for a patient. A system of at least two contact lenses is provided, each lens having a visual correction for a non-rotationally symmetric eye aberration. Each lens has a different level or degree of stabilization that comprises a thickness differential between a thickness of a stabilization zone and a thickness of a non-stabilization zone. A lens is selected from the system that provides the required visual correction at the lowest thickness differential suitable for that correction.

The system of the present invention provides a simple, cost-effective and efficacious means and method for optimizing comfort for a patient in need of vision correction by varying the stabilization design as a function of the required vision correction.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 1A-1C schematically show a system according to an embodiment of the present invention comprising three different contact lenses having a stabilization design for a high cylinder correction (1A), a stabilization design for a mid-cylinder correction (16), and a stabilization design for a low cylinder correction (1C).

DETAILED DESCRIPTION OF THE INVENTION

The present invention is directed to a system of contact lenses, each lens having a different level or degree of stabilization corresponding to a vision correction for a non-rotationally symmetric eye aberration and to a method of optimizing comfort for a patient in need of vision correction by varying stabilization design as a function of a required optical correction. For simplicity, an embodiment directed to toric contact lenses and astigmatic cylinder correction may be highlighted below; however, it is understood that the present invention is not so limited and can be applied to other types of lenses and vision correction (e.g., high order eye aberrations, keratoconus, and the like).

Many kinds of commercial toric contact lenses have a single stabilization design for all degrees of astigmatism. In contrast, according to one embodiment of the present invention, this system comprises a number of toric contact lenses having varying degrees of stabilization design as a function of astigmatic cylinder correction, thereby allowing optimization of both astigmatic vision correction and comfort (e.g., decreased lens awareness). The present invention may also be applied to custom vision correction, where a lens stabilization design is exactly determined by how much custom cylinder correction is required in the optical design.

I. Stabilization Mechanism and Design

The system of the present invention comprises contact lenses having any stabilization mechanism including, but not limited to, prism ballast, peri-ballast, dual zone, lid-stabilized zone design, gravity-stabilized zone design, accelerated stabilized design, and the like.

According to the present invention, the system may comprise any number of contact lenses, each lens having a different level or degree of stabilization corresponding to a cylinder correction (e.g., astigmatic cylinder correction). For example, a system may include two or more lenses: one lens having a stabilization design for a low cylinder correction and one lens having a stabilization design for a high cylinder correction. In a specific embodiment, a system may have multiple such lenses (e.g., corresponding to low, medium-low, medium or mid, medium-high, high cylinder correction). The system may include circular and/or non-circular contact lenses.

Figure 1A:
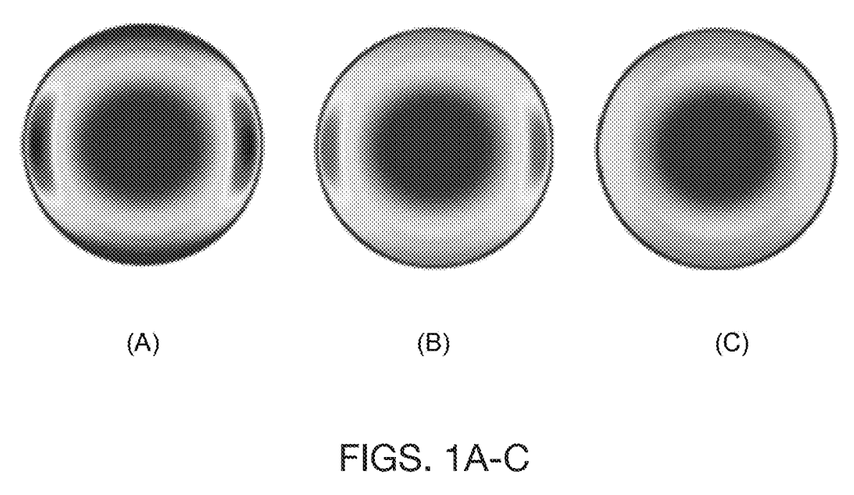

FIGS. 1A-1C show a system according to one embodiment of the present invention comprising three lenses. Each lens has a dual zone stabilization mechanism, that is, there is a first stabilization zone outside the optic region having an increased thickness compared to the rest of the lens in a nasal region and a second stabilization zone outside the optic region having an increased thickness in a temporal region. FIG. 1A illustrates a contact lens having a stabilization design for a high cylinder correction; FIG. 1B illustrates a contact lens having a stabilization design for a mid cylinder correction; and FIG. 1C illustrates a contact lens having a stabilization design for a low cylinder correction. As shown, the thicknesses of the stabilization design decreases from FIG. 1A to FIG. 1C.

According to the present invention, stabilization designs may be characterized by a thickness differential (TD) calculated between a thickness of at least one stabilization zone and a thickness of at least one non-stabilization zone. The thickness differential may be measured between an absolute maximum thickness of a lens and an absolute minimum thickness of the lens, regardless of the specific configuration and/or placement of a stabilization zone or stabilization design.

In an embodiment of the present invention, a system may comprise (1) a first contact lens having a first degree of stabilization; and (2) a second contact lens having a second degree of stabilization, the second degree of stabilization corresponding to a higher thickness differential than that of the first contact lens. The system may comprise additional contact lenses, for example, a third contact lens having a third degree of stabilization, the third degree of stabilization corresponding to a higher thickness differential than that of the second contact lens.

Figure 2A:
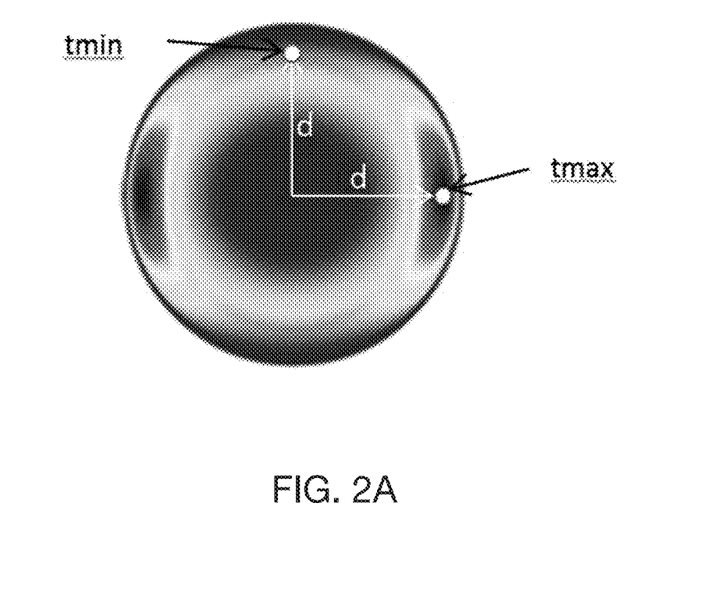
FIGS. 2A-2B shows the measurement of a thickness differential according to an embodiment of the present invention for a circular contact lens having a stabilization design (2A) and for a non-circular contact lens having a stabilization design (2B).

In a specific embodiment for a circular lens having a dual zone stabilization design, as shown in FIG. 2A, a thickness differential (TD) may be calculated between: 1) a maximum radial peripheral thickness (tmax) corresponding to a thickness of a stabilization zone, and 2) a minimum radial peripheral thickness (tmin) in a different meridian at the same distance (d) from the lens axis corresponding to non-stabilized zone (TD=tmax−tmin). For a rotationally symmetric lens having no stabilization design, the thickness differential would be zero.

Figure 2B:
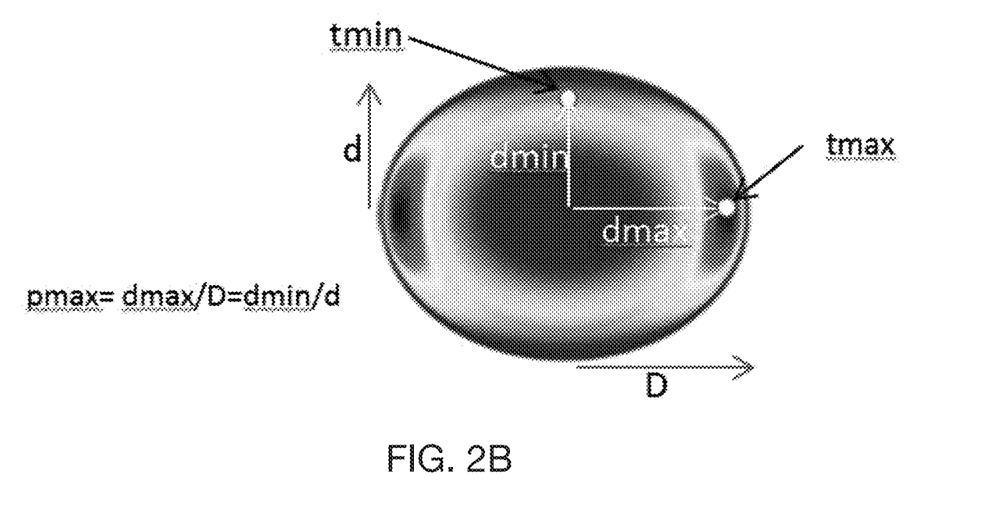

In a specific embodiment for a non-circular lens having a dual zone stabilization design, as shown in FIG. 2B, the maximum radial peripheral thickness (tmax) of a stabilization zone may be measured at a distance dmax, which corresponds to a pmax fraction of meridian diameter (D) (pmax=dmax/D). The minimum radial peripheral thickness (tmin) is measured at a distance dmin, which corresponds to the same pmax fraction of its respective meridian diameter (d) (pmax=dmin/d).

II. Cylinder Correction and Measurement of Rotational Instability

As noted, the system may comprise any number of contact lenses, each lens having a different level or degree of stabilization as a function of visual correction (e.g., cylinder). According to one embodiment of the present invention, an astigmatic visual correction may be defined by the following cylinder ranges:

1. A low cylinder correction (Low Cyl) has a diopter cylinder correction of $|DC| \leq 1.00$ diopter (D);
2. A mid cylinder correction (Mid Cyl) has a diopter cylinder correction of $1.00D < |DC| \leq 1.50D$; and
3. A high cylinder correction (High Cyl) has a diopter cylinder correction of $1.50D < |DC|$.

Of course, other ranges of cylinder correction could be utilized as desired (e.g., low, medium-low, medium or mid, medium-high, high cylinder correction or any combination thereof).

Figure 3:
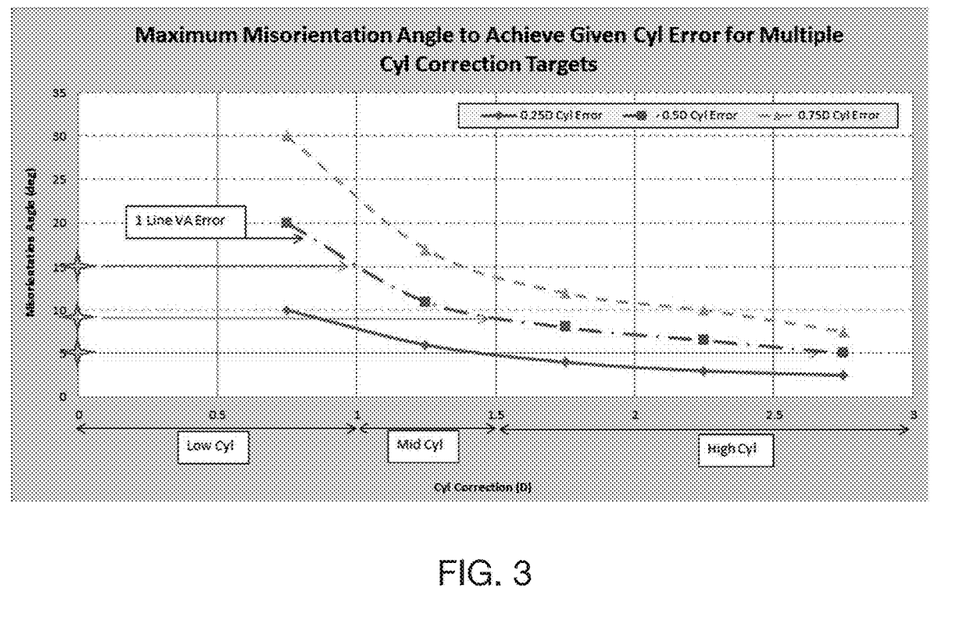
FIG. 3 is an optical modeling graph showing, for a given level of residual optical error, misorientation angle as a function of low cylinder correction, mid-cylinder correction, and high cylinder correction.

FIG. 3 is an optical modeling graph showing misorientation angle as a function of cylinder correction for low, mid, and high cylinder corrections and for various exemplary residual cylinder errors (i.e., 0.25D, 0.50D, and 0.75D). Residual cylinder error is the resultant astigmatic refractive error in the ocular system when a given lens misrotates on an eye. The three curves were obtained via computer optical modeling. A similar graph may be obtained based on specific astigmatic or other visual corrections and/or for differing degrees of cylinder error.

As shown, for a lens having a low cylinder correction (Low Cyl), misorientation angles for the residual cylinder errors are much larger than those for a mid cylinder correction (Mid Cyl) and those for a high cylinder correction (High Cyl). Likewise, for a lens having a high cylinder correction (High Cyl), much smaller misorientation angles result in the same residual cylinder errors. In other words, the higher the cylinder correction, the larger the optical error due to lens misorientation.

For example, the 0.50D residual cylinder error curve has misorientation angles of 15°, 8°, and 5° corresponding to approximately 1 line visual acuity (VA) reduction (high contrast/high luminosity distance VA) for the low cylinder correction, for the mid cylinder correction, and for the high cylinder correction, respectively. Thus, the graph demonstrates that contact lenses with a lower cylinder correction are much less sensitive to axis misalignments and rotational instability than lenses with higher cylinder corrections.

III. Rotational Instability of Lenses with Varying Stabilization Design

The misorientation angle of a lens may be measured over a series of time points during normal wear. The standard deviation, interquartile range (IQR), or some other variance parameter of such misorientation angle measurements may be used to characterize rotational instability of the lens over time.

Figure 4:
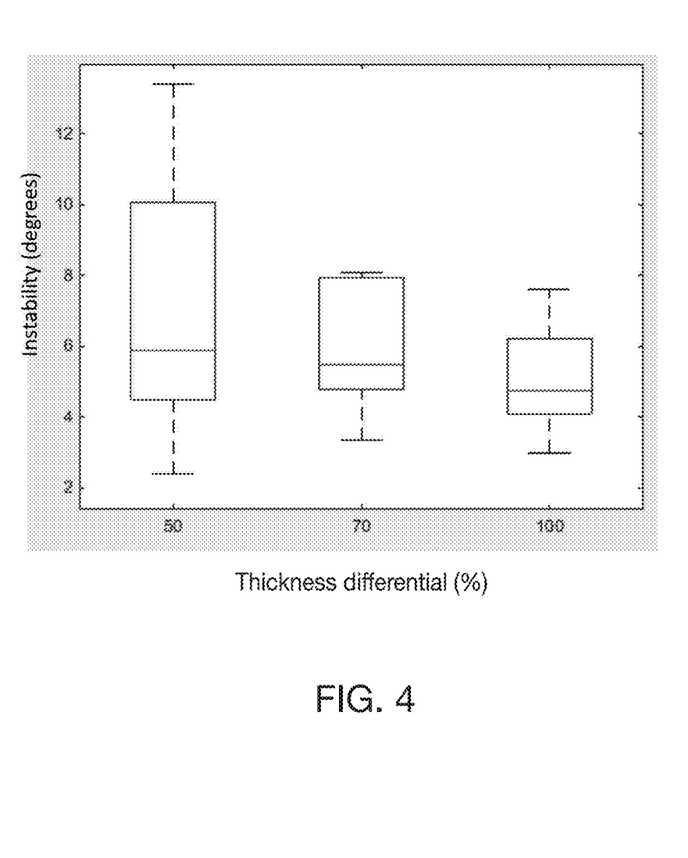
FIG. 4 is a clinical data graph showing measurement of rotational instability (misorientation angle) for three contact lenses with stabilization designs, the stabilization zones having thicknesses corresponding to 50%, 70%, and 100% of a maximum thickness differential, respectively.

FIG. 4 is a graph showing data from in vivo clinical measurements of rotational instability for three lens designs, such as those illustrated in FIGS. 1A-1C, each having a different degree of stabilization (but without any cylinder correction). The stabilization designs correspond to a maximum thickness differential in a stabilization zone for a high cylinder correction (i.e., 100%) and to lenses having a selected percentage of the maximum thickness differential (i.e., 50%, 70%). In specific embodiments, the thickness of a stabilization zone may be 30% to 95%, such as 50% to 80%, of a maximum thickness differential. In specific embodiments, the maximum thickness differential may be in a range from 0.1 mm to 0.5 mm, for example, from 0.15 mm to 0.4 mm.

The clinical measurements of misorientation angle were taken for 5 patients after forced versional eye movements in 9 different directions of gaze. As shown, the interquartile range (IQR box) indicates 75th percentile of rotational instability values of approximately 8°, and 6° for the 50%, 70% and 100% stabilization designs, respectively. The solid line in the interquartile range is the measured median value. Decreasing levels of thickness differential resulted in increased rotational instability.

The rotational instability data for different thickness differentials (as illustrated in FIG. 4) may be compared to the rotational instability data for different cylinder corrections (as illustrated in FIG. 3). This comparison establishes that contact lenses having stabilization designs according to FIG. 4 could meet the vision needs of a population with less than or equal to 2.75D astigmatic cylinder correction because the 75th percentile rotational instability values (approximately 10°, 8°, and 6°) of FIG. 4 are less than or substantially comparable to those of FIG. 3 for 0.50 diopters of residual cylinder error (15°, 8°, and 5°).

According to the present invention, the system of FIG. 4 advantageously includes contact lenses having not only a maximum thickness differential (100%), but also other stabilization designs (50%, 70% of maximum thickness differential) that provide less lens awareness and therefore greater comfort to a patient than the maximum thickness differential, while at the same time providing the required vision correction for low cylinder and mid cylinder ranges.

Figure 5:
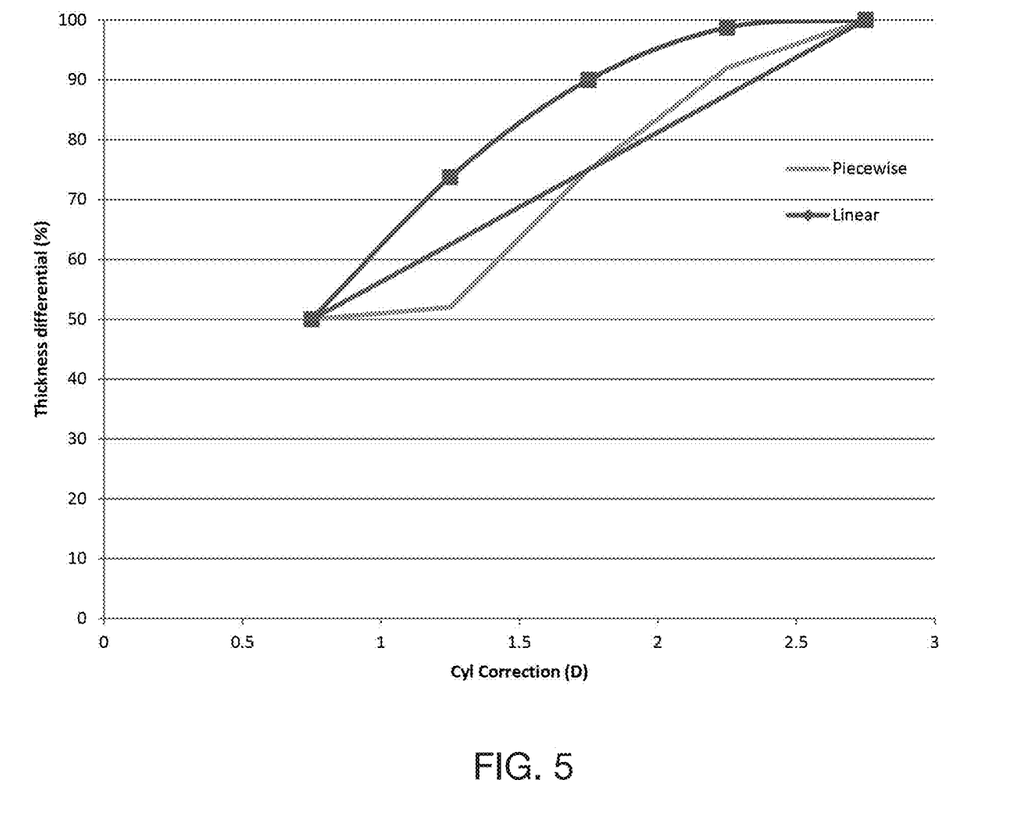
FIG. 5 is a graph showing three different mathematical relationships of thickness of a stabilization design as a function of cylinder correction.

For a system of lenses according to the present invention, the thickness differential may be modeled as a function of cylinder correction as illustrated in the graph of FIG. 5. As shown, the thickness differential may have a monotonically-increasing linear, piecewise, stepped, or polynomial relationship to cylinder correction.

The present invention is also directed to methods for optimizing lens comfort for a patient in need of an optical correction. A system of at least two contact lenses is provided as discussed above, in which each lens has a different degree of stabilization corresponding to an optical correction for a non-rotationally symmetric eye aberration. Each lens has a selected thickness differential calculated between a maximum thickness of a stabilization zone and a minimum thickness of a non-stabilization zone. A lens is selected from the system that provides the patient's required optical correction at the lowest thickness differential suitable for that correction. Thus, the selected lens may have a lower thickness differential (and higher degree of rotational instability) than a lens having a maximum thickness differential.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia, i.e., the loss of the ability of the crystalline lens to accommodate. Contact lenses are available in a variety of forms and are made of a variety of materials to provide different functionality.

Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

The lens designs of the present invention may be utilized in any of the contact lenses described herein, including, daily wear soft contact lenses, rigid gas permeable contact lenses, bifocal contact lenses, and hybrid contact lenses.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method for optimizing comfort of a set of toric contact lenses, comprising:
providing a set of toric contact lenses for correcting patient vision needs across a predetermined range of cylinder powers, wherein said predetermined range of cylinder powers is divided into at least a lower cylinder power correction range and a higher cylinder power correction range;
wherein said set of toric contact lenses has a first stabilization zone design including at least one stabilization zone having a first thickness differential for all lenses within said lower cylinder correction range and a second stabilization zone design including at least one stabilization zone having a second thickness differential for all lenses within said higher cylinder correction range, and wherein the second thickness differential is greater than the first thickness differential; and
providing patients having a cylinder correction need within said lower cylinder power correction range a toric lens with said first stabilization zone design and providing patients having a cylinder correction need within said higher cylinder power correction range a toric lens with said second stabilization zone design.

2. The method according to claim 1, wherein said higher cylinder correction range comprises an astigmatic diopter cylinder |DC|>=1.75 diopter (D), and said lower cylinder correction range comprises an astigmatic diopter cylinder of |DC|<1.75 D.

3. The method according to claim 2, wherein said first and second stabilization zone designs include dual stabilization zones positioned on first and second lateral sides of said lens respectively.

4. The method according to claim 3, wherein the dual stabilization zones of said first stabilization zone design have the same thickness differential.

5. The method according to claim 4, wherein the dual stabilization zones of said second stabilization zone design have the same thickness differential.

6. The method according to claim 1, wherein the second thickness differential is in a range from 0.1 mm to 0.5 mm.

7. The method according to claim 1, wherein the first thickness differential is 30% to 95% of said second thickness differential.

8. The method according to claim 7, wherein the first thickness differential is 50% to 80% of the first thickness differential.

9. The method according to claim 1, wherein said predetermined range of cylinder powers further comprises a middle cylinder power correction range between the lower and higher cylinder power correction ranges.

10. The method according to claim 9, wherein said set of toric contact lenses further includes a third stabilization zone design including at least one stabilization zone having a third thickness differential for all lenses within said middle cylinder power correction range, wherein said third thickness differential is greater than said first thickness differential and less than said second thickness differential.

11. The method according to claim 10, further comprising the step of providing patients having a cylinder correction need within said middle cylinder power correction range a toric lens with said third stabilization zone design.

12. The method according to claim 11, wherein the first, second and third stabilization zone designs include dual stabilization zones positioned on first and second lateral sides of said lens respectively.

13. The method according to claim 12, wherein the dual stabilization zones of the first stabilization zone design have the same thickness differential, the dual stabilization zones of the second stabilization zone design have the same thickness differential, and the dual stabilization zones of the third stabilization zones design have the same thickness differential.

* * * * *